No. 669,475.   
J. H. BULLARD.   
Patented Mar. 5, 1901.

LOCKING DEVICE FOR VEHICLE BRAKES.

(Application filed Nov. 15, 1899.)

(No Model.)

Witnesses:   
Inventor,   
James H. Bullard   
by   
Attorneys.

THE NORRIS PETERS CO., PHOTO-LITHO., WASHINGTON, D. C.

UNITED STATES PATENT OFFICE.

JAMES H. BULLARD, OF SPRINGFIELD, MASSACHUSETTS, ASSIGNOR TO THE OVERMAN AUTOMOBILE COMPANY, OF CHICOPEE, MASSACHUSETTS.

LOCKING DEVICE FOR VEHICLE-BRAKES.

SPECIFICATION forming part of Letters Patent No. 669,475, dated March 5, 1901.

Application filed November 15, 1899. Serial No. 737,045. (No model.)

*To all whom it may concern:*

Be it known that I, JAMES H. BULLARD, a citizen of the United States of America, residing at Springfield, in the county of Hampden and State of Massachusetts, have invented new and useful Improvements in Locking Devices for Vehicle-Brakes, of which the following is a specification.

This invention relates to vehicle-brakes, and more especially to that class of lever-brakes operated by the foot of the driver, the object of the invention being the provision of means in a brake of this class whereby it may be applied with any desired degree of force to arrest the movement of the vehicle and then locked in this operative position, the brake remaining set until the locking device has been released; and the invention consists in a construction, all as hereinafter described and claimed, in which the locking device forms part of the brake and is actuated by the same means (as the foot of the driver) which is used to apply the brake.

In the drawings forming part of this specification, Figure 1 consists of a partly-sectional outline view of a wagon-body having the brake forming the subject of this application applied thereto. Fig. 2 is an enlarged side elevation of the brake-lever and its locking devices. Fig. 3 is an end elevation thereof viewed from the front of the vehicle.

The form of brake shown herein is the well-known strap-brake, comprising a strap 1, partially encircling a flanged pulley 2, secured on the hub of the wheel 3 of a vehicle 4. As is usual in this construction, one end of the strap is attached to a part 5 of the frame of the running-gear and the opposite free end of the strap is connected pivotally to a connecting-rod 6, extending to an upstanding arm 7 on the hub 8 of the swinging brake-lever 9, the latter extending up through the floor of the vehicle in any position within convenient reach of the foot of the driver.

Heretofore the construction thus far described has constituted the entire brake mechanism, and to keep the brake applied to the vehicle it has been necessary for the driver to keep a constant pressure on the brake-lever with the foot, and in descending long grades with a heavily-loaded vehicle it is very fatiguing to do so. To obviate this objection, I have devised a locking device for the brake-lever constructed substantially as follows: On the end of the stud 10, which is rigidly secured in a horizontal position to the frame of the running-gear of the vehicle, (in this instance it is shown secured to the part 5 thereof,) there is secured in a fixed vertical position the arm 11, the upper edge of which is formed on a curve whose center is the center of the stud 10, and this curved edge of the arm is provided with teeth of suitable form to receive the end of a pawl-lever 12, pivoted on the brake-lever at 13, and having a free swinging movement in a vertical plane. A connecting-rod 14 is connected, pivotally, to the free end of said pawl-lever and extends upward therefrom to a point near the end of the brake-lever. On the upper end of the latter there is pivoted the foot-plate 15, adapted to swing in the same plane as the brake-lever and independently thereof. On said foot-plate a short arm 16 extends at right angles to the brake-lever and is pivotally connected with the upper end of said connecting-rod. Said brake-lever swings on and is supported by the said stud 10, on which its hub 8 oscillates. Said arm 11 is secured on the end of the stud by turning down the end of the latter, whereby a shoulder is formed against which said arm may be forced by a nut without obstructing the free swing of the brake-lever located between said arm and the head of the stud. Said arm is rigidly fixed on said stud by a key 11$^a$, Figs. 2 and 3. When the foot is applied to the foot-plate to move the brake-lever to set the brake, if the heel is held down toward the brake-lever, the foot-plate will remain in the position in which it is shown in full lines in Fig. 2, and thus the pawl-lever 12 will be held out of engagement with the teeth on the arm 11. When the desired braking power has been applied to the vehicle, the toe of the foot may be pressed forward and the foot-plate 15 swung on its pivot and the pawl-lever thus forced down toward and into engagement with one of the teeth on the arm 11, and if the foot be now removed the endwise strain on the connecting-rod 6, extending from the strap 1 to the arm 7 on the hub of the brake-lever, will prevent the disengagement of said pawl-lever from the toothed arm 11, and the brake may be left on as long as desired. To disengage the pawl and release the brake, it is only necessary to press on the foot-plate and then swing it back to the full-line position it occupies in Fig. 2 and allow the brake-lever to swing back to its normal position.

With a locking device for brakes constructed as herein described, where the operative parts thereof are all supported on the frame of the running-gear, and hence whereby one part of the device can be given no movement relative to another part by reason of the jolting of the vehicle, the locking devices cannot by reason of such jolting movement become disengaged and release the brake.

The device affords convenient means for holding a vehicle in its place, if for any reason it becomes necessary to bring it to a stop on a grade, and is particularly adaptable to automobile vehicles, in the management of which there is much for the driver to attend to without giving special attention to the brake.

Having thus described my invention, what I claim, and desire to secure by Letters Patent of the United States, is—

1. The combination with the running-gear of a vehicle, of a pulley secured on a rotating part of said gear, as the hub of a wheel, a frame, a foot-lever swinging in a vertical plane and pivoted on said frame, a connection extending from said lever to a point near said pulley, a strap partially encircling said pulley and having one end secured to the free end of said connection and the other end secured to said frame; an arm secured to said frame by the side of said foot-lever, teeth on the upper edge of said arm, a pawl-lever hung on said foot-lever and adapted to engage said toothed arm, an oscillating foot-plate on the upper end of said foot-lever, and a connecting-rod pivotally attached to said foot-plate and said pawl-lever, whereby movements of said plate are adapted to actuate said pawl-lever to engage and disengage it from the teeth on said arm, substantially as described.

2. The combination of the swinging foot-lever 9, the connecting-rod 6, the strap 1, and the pulley 2, of an oscillating foot-plate attached to the upper end of said foot-lever, a rigid toothed arm in proximity to said foot-lever, a pawl-lever pivoted to the foot-lever and adapted to swing in a vertical plane, a rigid connection pivoted to said foot-plate and said pawl-lever, whereby the oscillations of the foot-plate on the foot-lever are adapted to engage and disengage said pawl-lever from the teeth of the toothed arm 11, substantially as described.

JAMES H. BULLARD.

Witnesses:
WM. H. CHAPIN,
K. I. CLEMONS.